United States Patent
Tuyls et al.

(10) Patent No.: US 8,281,148 B2
(45) Date of Patent: Oct. 2, 2012

(54) SECURELY COMPUTING A SIMILARITY MEASURE

(75) Inventors: Pim Theo Tuyls, Eindhoven (NL);
Evgeny Verbitskiy, Eindhoven (NL);
Berry Schoenmakers, Eindhoven (NL);
Marten Erik Van Dijk, Cambridge, MA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 852 days.

(21) Appl. No.: 11/718,806

(22) PCT Filed: Nov. 9, 2005

(86) PCT No.: PCT/IB2005/053690
§ 371 (c)(1),
(2), (4) Date: Aug. 11, 2008

(87) PCT Pub. No.: WO2006/054208
PCT Pub. Date: May 26, 2006

(65) Prior Publication Data
US 2009/0006855 A1    Jan. 1, 2009

Related U.S. Application Data

(60) Provisional application No. 60/628,408, filed on Nov. 16, 2004, provisional application No. 60/668,905, filed on Apr. 6, 2005.

(51) Int. Cl.
*H04L 29/06* (2006.01)
(52) U.S. Cl. ........ 713/185; 713/182; 713/184; 713/186; 380/30; 380/255; 382/117; 382/124

(58) Field of Classification Search .................. 380/255, 380/30; 713/186, 202, 184, 182; 382/117, 382/124
See application file for complete search history.

(56) References Cited

U.S. PATENT DOCUMENTS

| | | | |
|---|---|---|---|
| 6,697,947 B1* | 2/2004 | Matyas et al. | 713/182 |
| 6,772,339 B1* | 8/2004 | Jakobsson et al. | 713/168 |
| 2003/0133566 A1* | 7/2003 | Soldera | 380/30 |
| 2005/0008152 A1* | 1/2005 | MacKenzie | 380/44 |
| 2007/0116283 A1* | 5/2007 | Tuyls et al. | 380/255 |
| 2008/0065900 A1* | 3/2008 | Lee et al. | 713/186 |

OTHER PUBLICATIONS

Felix Brandt, "Eficient Cryptographic Protocol Design Based on El Gamal Encryption", Jun. 2004, http://www.amadousarr.free.fr/doc/millionaire.pdf.*
Kerschbaum et al., "Private Fingerprint Verification without Local Storage", Jul. 2004, https://ww.cerias.purdue.edu/assets/pdf/bibtex-archive/2004-99.pdf.*
MIT95, "6.915 Computer and Network Security Lecture 24", Dec. 1995, web.mit.edu/6.857/OldStuff/Fall95/lectures/lecture24.ps.*

* cited by examiner

*Primary Examiner* — Jeffrey Pwu
*Assistant Examiner* — Hee Song
(74) *Attorney, Agent, or Firm* — Larry Liberchuk

(57) ABSTRACT

The present invention relates to a method and a system of securely computing a measure of similarity for at least two sets of data. A basic idea of the present invention is to securely compare two sets of encrypted data to determine whether the two sets of data resemble each other to a sufficient extent. If the measure of similarity complies with predetermined criteria, the two sets of data from which the encrypted sets of data originate are considered to be identical.

14 Claims, 2 Drawing Sheets

SECURELY COMPUTING A SIMILARITY MEASURE

Figure 1:
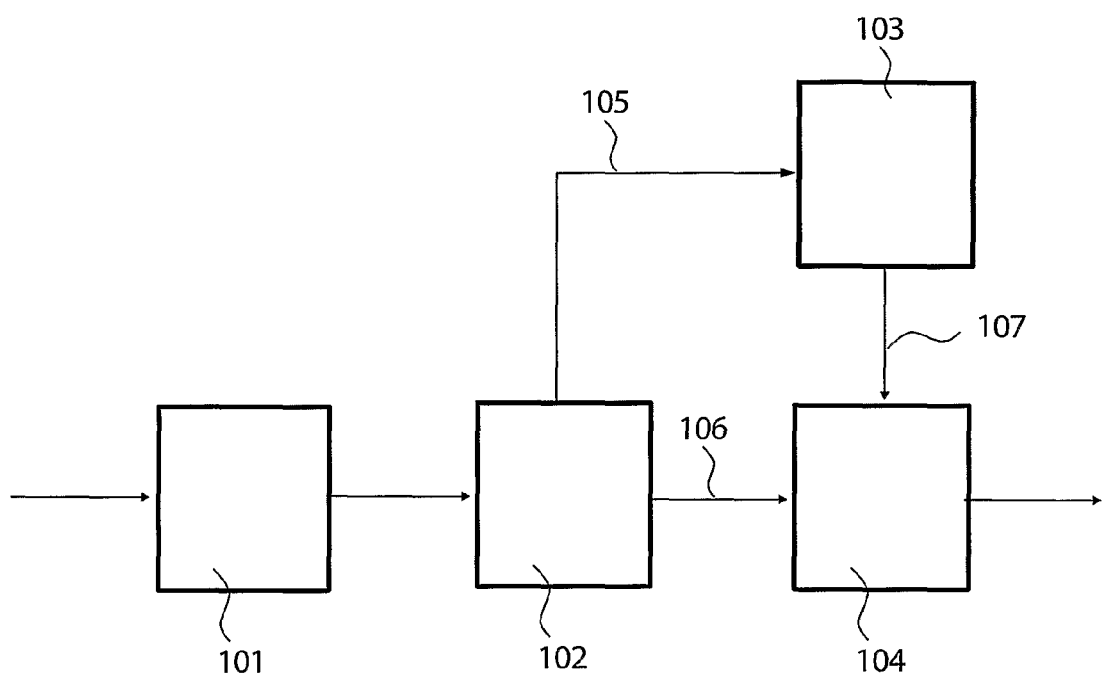

The present invention relates to a method and a system of securely computing a measure of similarity for at least two sets of data.

Authentication of physical objects may be used in many applications, such as conditional access to secure buildings or conditional access to digital data (e.g. stored in a computer or removable storage media), or for identification purposes (e.g. for charging an identified individual for a particular activity, or even for entering a country). The use of biometrics for identification and/or authentication, wherein features that are unique to a user such as fingerprints, irises, ears, faces, etc. are used, is to an ever increasing extent considered to be a better alternative to traditional identification means such as passwords and pin-codes, and "manual" identification involving visual comparison between an individual and, for example, a photo. In the future, it is possible that conventional passports, which require manual identification by a customs officer, will be replaced by electronic passports employing biometric features.

The biometric features are compared to reference data. If a match occurs, the user is identified and can be granted access. The reference data for the user has been obtained earlier and is stored securely, e.g. in a secure database or smart card. The physical object to be authenticated may also be non-human. For example, the object may be a storage medium like a CD, a DVD or a solid-state memory containing protected digital content. In that case, biometrics is not necessarily used, but in an analog manner, some identifying feature (in the form of e.g. a bit sequence) that should be kept secret is provided and compared to the corresponding reference data.

In authentication, the user claims to have a certain identity and an offered biometric template is compared with a stored biometric template that is linked to the claimed identity, in order to verify correspondence between the offered and the stored template. In identification, the offered biometric template is compared with all stored available templates, in order to verify correspondence between the offered and stored template. For security reasons, it is important to develop methods to derive secrets from (generally noisy) biometric measurements. It should be noted that biometric data is a good representation of the identity of an individual, and unauthenticated acquirement of biometric data associated with an individual can be seen as an electronic equivalent of stealing the individual's identity. After having acquired appropriate biometric data identifying an individual, the hacker may impersonate the individual whose identity the hacker acquired. Moreover, biometric data may contain sensitive and private information on health conditions. Hence, the integrity of individuals employing biometric authentication/identification systems must be safeguarded.

As biometrics provides sensitive information about an individual, there are privacy problems related to the management and usage of biometric data. For example, in prior art biometric systems, a user must inevitably trust the biometric systems completely with regard to the integrity of her biometric template. During enrollment—i.e. the initial process when an enrolment authority acquires the biometric template of a user—the user offers her template to an enrolment device of the enrolment authority which stores the template, possibly encrypted, in the system. During verification, the user again offers her template to the system, the stored template is retrieved (and decrypted if required) and matching of the stored and the offered template is executed. Cryptographic techniques to encrypt or hash the biometric templates and perform the verification (or matching) on the encrypted data such that the real template is never available in the clear can be envisaged. However, cryptographic functions are intentionally designed such that a small change in the input results in a large change in the output. Due to the very nature of biometrics and the measurement errors involved in obtaining the offered template as well as the stored template due to noise-contamination, the offered template will never be exactly the same as the stored template and therefore a matching algorithm should allow for differences between the two templates, i.e. a biometric authentication/verification scheme has to be intrinsically robust to noise. This makes verification based on encrypted templates problematic.

ID613356 (NL030552, WO IB2004/0506, EP03101453.3) proposes an approach of performing biometric authentication in a secure and private way. This scheme employs a helper data scheme, which enables robustness to noise. In order to combine biometric authentication with cryptographic techniques, helper data is derived during the enrolment phase. The helper data guarantees that a unique string can be derived from the biometrics of an individual during the authentication as well as during the enrolment phase. Since the helper data is stored in a database, it is considered to be public. In order to prevent impersonation, reference data which is statistically independent of the helper data, and which reference data is to be used in the authentication stage, is derived from the biometric. In order to keep the reference data secret, the reference data is stored in hashed form. In this way impersonation becomes computationally infeasible. A problem with the approach of ID613356 is that it still leaks information about the original biometrics identifier to a possibly malicious verifier.

An object of the present invention is to provide a secure cryptographic scheme for comparing two sets of data to determine whether they resemble each other to a certain extent, without having to access plain text versions of two data sets.

The object of the present invention is attained by a method of securely computing a measure of similarity for at least two sets of data in accordance with claim 1 and a system for securely computing a measure of similarity for at least two sets of data in accordance with claim 8.

A basic idea of the present invention is to securely compare two sets of data to determine whether the two sets of data resemble each other to a sufficient extent. Typically, a measurement of a biometric feature is represented (after initial processing) as a sequence of bits, i.e. a long series of 0's and 1's. A well-known prior art example of such a bit sequence is the IrisCode®; a measurement is performed on an eye of an individual, the features of the iris are encoded into a 512 byte IrisCode record for enrolment or recognition. The resulting IrisCode record is compared to every IrisCode record enrolled in a database for recognition. Generally in a biometric identification scheme, the main task is to decide whether two sequences X, Y belong to the same person or not. The probability that two measurements of the same biometric identifier, i.e. the biometric feature pertaining to a specific individual, result in completely identical sequences (i.e. X=Y) is negligible. However, if X and Y are indeed the measurements of the same biometric identifier, they are similar. Hence, a biometric identification system must be capable of deciding to which extent X and Y resemble each other. Note that, as previously mentioned, the physical object to be authenticated may alternatively be non-human. For example, the object may be a storage medium like a CD, a DVD or a solid-state memory containing protected digital content. In that case, biometrics is not necessarily used, but in an analog manner, some identifying feature (in the form of e.g. a bit sequence) that should be kept secret is provided and compared to the corresponding reference data.

A common approach employed in biometric identification systems is to compute a so called Hamming distance $d_H(X, Y)$, i.e. the number of mismatches between the vector $X = (x_1, \ldots, x_n)$ and the vector $Y=(y_1, \ldots, y_n)$. The Hamming distance is defined as:

$$d_H(X, Y) = \sum_{i=1}^{n} (x_i - y_i)^2 = \sum_{i=1}^{n} x_i^2 - 2x_i y_i + y_i^2 \quad (1)$$

Due to the fact that binary vectors are employed, the Hamming distance may be expressed as:

$$d_H(X, Y) = \sum_{i=1}^{n} x_i - 2x_i y_i + y_i \quad (2)$$

If this distance is considered sufficiently small, X and Y are deemed identical. Typically, "sufficiently small" implies that the value of the Hamming distance for two measurements of a biometric feature lies below a predetermined threshold value. For example, in IrisCode, the Hamming distance must be smaller than 20% of the total vector length n. Hence, if the vectors comprise 6 bits, there may only be a mismatch of one bit when comparing X to Y, or the two vectors will be considered not to be identical. In order to compute the Hamming distance (or any other measure of similarity) in prior art identification systems, the measurements (i.e. X and Y) of the biometric features must be revealed.

The invention described in the present application specifies a scheme for computing a similarity measure (e.g. the Hamming distance) between an encrypted copy of X, E(X), and an encrypted copy of Y, E(Y). The proposed scheme only reveals whether the similarity measure is above or below a predetermined threshold value, and no other information pertaining to the plaintext representations X, Y of the measured biometric identifier.

The scheme provides secure computation of a defined measure of similarity between two vectors X and Y representing the measurement of a biometric feature, and decides a relation between the similarity measure and the predetermined threshold value, without revealing the plaintext representations, X and Y, of the measured biometric identifier. In the following, it is assumed that the similarity measure is given by the Hamming distance $d_H(X, Y)$ defined above. However, other similarity measures may be employed.

In order to perform the computations, a homomorphic threshold encryption system, such as e.g. Paillier or El Gamal, is used. The term "homomorphic" implies that $E(x+y)=E(x)E(y)$. The term further implies that $E(x)^a=E(x*a)$ for any $x$ and $a$. An encryption of a parameter $x$ is denoted by $E_{pk}(x)$, where "pk" denotes public key encryption. Thus, a user and a verifier have access to the same public key pk. Further, the user and the verifier each has access to a share of a corresponding private key. The shares of the private key are used for decryption.

The user may carry her share with her (e.g. on a smart card) or the share may be stored in a sensor of the biometric identification system with which the user interacts. During enrolment, a sequence of bits X representing a biometric identifier, which sequence is assumed to comprise a binary string of length n, i.e. $X=(x_1, \ldots, x_n)$, is captured and encrypted with the common public key pk: $E_{pk}(X)=(E_{pk}(x_0), \ldots, E_{pk}(x_n))$ at the sensor. This is typically performed on a bit-by-bit basis. The entries $x_i$ can be represented as binary strings through the following representation:

$$x_i = \sum_{j=0}^{m} x_{ij} 2^j.$$

The string $E_{pk}(X)$ is then passed on to the verifier, which stores the string. Note that the verifier cannot decrypt $E_{pk}(X)$, as the verifier only has access to his share of the private key, and not to the share of the user. Hence, the plaintext representation X of the biometric identifier remains hidden for the verifier.

During authentication, a noisy representation Y of the biometric identifier is obtained at a sensor of the system. Note that this sensor not necessarily is the same as the sensor with which enrolment was performed. Typically, the authentication sensor is remote from the enrolment sensor. For example, the enrolment—which is performed only once—may be made at an enrolment authority in the form of any DVD/video store comprised in a greater chain of stores, while authentication typically is performed at a specific store at which the user rents a DVD. This store may be viewed upon as the actual verifier, at which the user is to be authenticated. The process of authenticating the user is performed every time she rents a DVD at the store. This authenticating sensor encrypts Y with the common public key pk; $E_{pk}(Y)=(E_{pk}(y_1), \ldots, E_{pk}(y_n))$. Now, a secure protocol will be run to find out whether $d_H(X, Y)<T$, where T is a predetermined threshold value, without revealing any other information with respect to X and Y. Now, $E_{pk}(d_H(X, Y))$ is securely computed as follows:

$$E_{pk}(d_H(X, Y)) = \prod_{i=1}^{n} E_{pk}(x_i^2 - 2x_i y_i + y_i^2) \quad (3)$$
$$= \prod_{i=1}^{n} E_{pk}(x_i - 2x_i y_i + y_i) =$$
$$= \prod_{i=1}^{n} E_{pk}(x_i) E_{pk}(y_i) E_{pk}(x_i)^{-2y_i}$$

In order to perform this computation, the verifier sends $E_{pk}(x_i)$ to the authenticating sensor, where secure computation is undertaken. The authenticating sensor computes $E_{pk}(y_i)$ and $E_{pk}(2x_i y_i)=E_{pk}(x_i)^{2y_i}$ and a proof which is arranged to show that encrypted output data is correct. Hence, at the authenticating sensor, a first set $E_{pk}(X)$ of encrypted data (received from the enroller) and a first set Y of plaintext data are obtained. The first set Y of plaintext data is then encrypted to create a second set $E_{pk}(Y)$ of encrypted data. Further, the authenticating sensor provides the proof, which may be publicly verified, that the second set $E_{pk}(Y)$ of encrypted data in fact was created by encrypting the first set Y of plaintext data with the public key pk.

Then, the authenticating sensor publishes $E_{pk}(y_i)$ and $E_{pk}(2x_i y_i)$ and the proof, and the verifier checks the proof. Finally, the verifier—which contributes with $E_{pk}(x_i)$—and the authenticating sensor together compute $E_{pk}(d_H(X, Y))$ using equation (3), taking advantage of the homomorphic properties of the encryption system. Consequently, based on in part the first set $E_{pk}(x_i)$ of encrypted data and in part the second set $E_{pk}(y_i)$ of encrypted data, a measure of similarity $E_{pk}(d_H(X, Y))$ is computed for said first and second set of encrypted data.

Finally, a secure computation of whether $d_H(X, Y) > T$ must be made. Computations described in the above yield $E_{pk}(d_H(X,Y))$, i.e. the encryption of the Hamming distance $d_H(X,Y)$. In order to check whether $d_H(X, Y) > T$, the authenticating sensor and the verifier will run a two-party protocol. Given the representation $E_{pk}(d_H(X, Y))$, the so called Millionaires protocol may for example be used to find out whether $d_H(X, Y) > T$. Then, the outcome of the comparison is the only information that is revealed.

At this stage, the encrypted bits representing the Hamming distance between X and Y have been computed. Note that neither one of the parties can decrypt this information. The last stage of the protocol is the comparison with a given threshold value T. In fact, even the threshold value may be encrypted (on a bit-by-bit-basis) and may be unknown to both parties.

The secure computation relating to whether $d_H(X, Y) > T$, given $E(d_H(X, Y))$ and $E(T)$, may be performed in many different ways. For example, the protocols developed in "Practical Two-Party Computation based on the Conditional Gate" by B. Schoenmakers and P. Tuyls, Asiacrypt 2004, LNCS Springer-Verlag 2004 may advantageously be used.

The scheme of the present invention combines the advantages of strong cryptography with a possibility to compare similar, but nevertheless different objects, which typically are corrupted by noise. The scheme introduces private and secure biometric authentication which reveals no information pertaining to the original biometric features, under the assumption that the used public key encryption system is secure. It provides protection security against a malicious verifier.

An additional feature of this invention is the fact that common biometric authentication techniques may be employed, but in a secure manner, i.e. under encryption. The computation of the measure of similarity may be outsourced to powerful servers in a secure manner, i.e. the servers obtain no information about the biometric template. For the computations, the sensor needs no secret key, only a public key (although the sensor may have a secret key for authentication purposes). Further, if the sensor (or the verifier) is attacked, no crucial information can be obtained and the privacy of the user is thus not compromised. The similarity measure used can be chosen rather freely and can easily be updated without modifying the existing sensor which is used. A further advantage is provided in that the computations may be publicly verified.

Note that even though the present invention has been described in an exemplifying manner by computing a measure of similarity for two sets of data, it is realized by a skilled person that the computation may be extended to further sets of data. In that case, other measures than just the Hamming distance may have to be employed. For instance, it is possible to use a maximum or average distance between the sets of data for which the measure of similarity are computed, or the edit distance, the so called $l_1$ distance etc.

In accordance with an embodiment of the present invention, the proof is computed as follows. Given the private key $\alpha = \log_g h$, decryption is performed by calculating $b/a^\alpha$, which is equal to $g^m$ for some message $m \in Z_q$. Encryptions are computed by means of a common public key h while decryptions are done using a joint protocol between parties, each party possessing a share of the private key $\alpha = \log_g h$. The parties obtain their share by running a distributed key generation protocol.

Distributed key generation is achieved by having parties $P_1$, $P_2$ (e.g. the sensor and the verifier) first broadcast commitments $c_i = g^{\alpha_i} h^{r_i}$, with $\alpha_i, r_i \in Z_q$ for i=1, 2, and then broadcast the values $r_i$ along with proofs of knowledge of $\log_g h_i$, where $h_i = c_i/h^{r_i}$ for i=1, 2. The joint public key is $h = h_1 h_2$, with private key $\alpha = \alpha_1 + \alpha_2$. To decrypt an encryption (a, b), party $P_i$ produces $d_i = a^{\alpha_i}$, along with a proof that $\log_a d_i = \log_g h_i$, i.e. a proof being arranged to show that the encrypted output data is correct without revealing information about the plaintext copies of the representations of the biometric identifiers. The message is then recovered from $b/(a_1 a_2)$.

Further features of, and advantages with, the present invention will become apparent when studying the appended claims and the following description. Those skilled in the art realize that different features of the present invention can be combined to create embodiments other than those described in the following.

Figure 2:
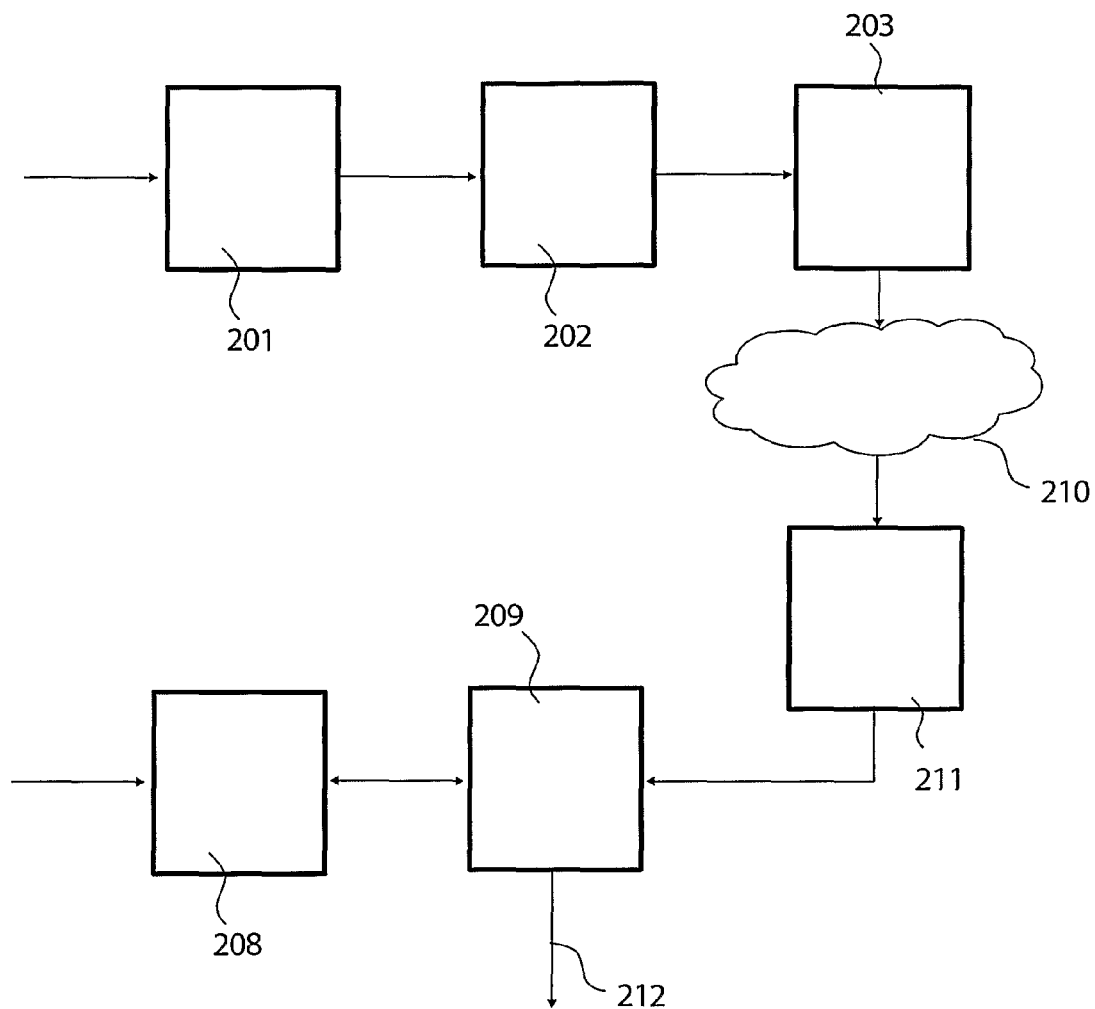

The present invention will be described in detailed with reference made to the attached drawings, in which:

FIG. 1 shows a basic prior art system for identification and authentication of an individual based on biometric data associated with the individual; and FIG. 2 shows a system for identification and authentication of an individual based on biometric data associated with the individual, in accordance with the present invention.

FIG. 1 shows a basic prior art system for identification and authentication of an individual based on biometric data associated with the individual, in which system the present invention advantageously may be employed. An individual's raw biometric data, e.g. fingerprints, iris or retinal, facial or hand geometry, voice features etc., is acquired at a sensor 101. The acquired data (i.e. raw, plaintext data) is typically processed at a processing device 102 such as a digital signal processor (DSP). This data is then stored, preferably in encrypted form, via path 105 in a database storage 103 of a service provider. This is an initialization procedure which is performed once for each individual that wishes to access the particular system, in order to register the individual. Encryption is performed to protect the identity, i.e. the biometric data, of the individual. Subsequently, when the individual wishes to access the service, she provides plaintext biometric data to the sensor 101. This data is then, after processing, via path 106 compared to the biometric data of the individual which previously was stored in the database. If there is a match in the comparison performed at a comparing device 104 between the sets of data provided via path 106 and 107, the individual is given access to the service that is provided. Hence, with reference to FIG. 1, the sensor 101 may in an initial feature-extracting session act as an enroller, whereas in a subsequent session, the sensor 101 acts as a verifier that checks for correspondence, in the comparing device 104, between subsequently provided biometric information Y (via path 106) and initially enrolled biometric information X (via path 107). As previously mentioned, the devices of FIG. 1 may be located remotely from each other.

FIG. 2 shows a system for identification and authentication of an individual based on biometric data associated with the individual, in accordance with the present invention. Here, the enrolling sensor 201 and the verifying, or authenticating, sensor 208 are located remote from each other. As in FIG. 1, the acquired data (i.e. raw, plaintext data) is processed at a DSP 202. This data is encrypted and stored in a database storage 203. Subsequently, when the individual wishes to access the system, she provides plaintext biometric data to the authenticating sensor 208. This data is then encrypted in DSP 209. Hence, with reference made to FIG. 2, where it is assumed that a biometric template X previously has been provided to the enrolling sensor 201, encrypted at the DSP 202 and stored in encrypted form $E_{pk}(X)$ in the database storage 203, when an individual requires access to the system, her biometric template Y (which is a noisy representation of X) is extracted by the verifying sensor 208 (also referred to as the authenticating sensor) and encrypted by the DSP 209 to created an encrypted copy $E_{pk}(Y)$. Typically, the DSP 209 is included in the authenticating sensor 208.

The string $E_{pk}(X)$ is passed on to the verifier 211, which stores the string. The verifier 211 also typically contains a DSP, even though it is not shown in FIG. 2. Note that the verifier cannot decrypt $E_{pk}(X)$, as the verifier only has access to its share of the private key, and not to the share of the individual. Hence, the plaintext representation X of the biometric identifier remains hidden for the verifier 211. As previously mentioned, a secure protocol will be run to find out whether $d_H(X, Y)<T$, where T is a predetermined threshold value, without revealing any information with respect to X and Y. Now, $E_{pk}(d_H(X, Y))$ is computed in the manner previously described. The verifier 211 sends $E_{pk}(x_i)$ to the authenticating sensor 208, which performs secure computation.

The authenticating sensor 208 computes $E_{pk}(y_i)$ and $E_{pk}(2x_iy_i) = E_{pk}(x_i)^{2y_i}$ and a proof which is arranged to show that encrypted output data is correct. Hence, the authenticating sensor provides a proof, which may be publicly verified, that the second set $E_{pk}(Y)$ of encrypted data in fact was created by encrypting the first set Y of plaintext data with the public key pk. Then, the authenticating sensor 208 publishes $E_{pk}(y_i)$ and $E_{pk}(2x_iy_i)$ and the proof, and the verifier 211 checks the proof. Finally, the verifier—which contributes with $E_{pk}(x_i)$—and the authenticating sensor together compute $E_{pk}(d_H(X, Y))$ as previously described, taking advantage of the homomorphic properties of the encryption system.

Finally, a secure computation of whether $d_H(X, Y)>T$ must be made. Computations described in the above yield $E_{pk}(d_H(X,Y))$, i.e. the encryption of the Hamming distance $d_H(X, Y)$. In order to check whether $d_H(X, Y)>T$, the authenticating sensor 208 and the verifier 211 will run a two-party protocol. If the value of the Hamming distance lies below the threshold T, the individual will be given access to the system, which is indicated by path 212. Note that in FIG. 1 as well as in FIG. 2, the steps of the present invention are typically performed by a microprocessor (not shown) implemented in the respective device, which processor executes an appropriate software package.

The present invention is advantageous, in addition to advantages already mentioned, since it enables outsourcing of computations, which gives additional flexibility for the design of sensors, etc. Further, computational load can be shifted from the sensors to, for instance, a server (not shown) at which the computations are performed.

It is assumed that the sensor(s) contain only a (joint) public key, and hence no secrets, and the server(s) contain a corresponding secret key. In case only one single server is employed, a first outsource algorithm may be employed. In case several servers are used, the secret key is shared by means of a secure sharing scheme amongst those servers. In that case, a second outsource algorithm may be used.

In addition to access control, a cryptographic key K may be derived from biometric data. The key is only released when the biometric template of the person at the sensor matches the template stored in the reference database. Briefly, this can be done as follows. Let s=1 if X matches Y and s=0 otherwise. Further, assume that the outcome of the matching computation gives the encryption of s, i.e. E(s). The key K can be released as follows; given E(K) and E(s), the concerned parties compute the encryption E(r) of a jointly generated random number r, and together compute E(K+r(s−1)). This value is then decrypted by using threshold decryption. Clearly, in the case the biometric templates X and Y match, the decryption releases the key K. If the templates do not match, a random string K−r is obtained.

Even though the invention has been described with reference to specific exemplifying embodiments thereof, many different alterations, modifications and the like will become apparent for those skilled in the art. The described embodiments are therefore not intended to limit the scope of the invention, as defined by the appended claims. Instead of a DSP, a generic processing element can be used.

The invention claimed is:

1. A method of securely computing a measure of similarity for at least two sets of data, the method comprising:
   obtaining a first set of encrypted data and a first set of plaintext data;
   encrypting the first set of plaintext data, wherein a second set of encrypted data is created;
   computing, based on in part the first set of encrypted data and in part the second set of encrypted data, a measure of similarity for said first and second set of encrypted data;
   providing a publicly verifiable proof that the encrypted sets of data and the measure of similarity have been correctly computed;
   determining whether the measure of similarity complies with a predetermined criteria;
   wherein the data employed is extracted from a biometric feature of an individual, and the encryption performed comprises homomorphic encryption.

2. The method in accordance with claim 1, wherein said measure of similarity comprises a Hamming distance.

3. The method in accordance with claim 1, wherein the measure of similarity is considered to comply with a predetermined criteria if said measure of similarity lies below a preset threshold value.

4. The method in accordance with claim 1, wherein a first party encrypts the first set of plaintext data to provide the second set of encrypted data and said proof, a second party provides the first set of encrypted data and the first and second party compute said measure of similarity by combining the first and second set of encrypted data.

5. The method according to claim 4, wherein the first party provides the second party with said proof.

6. The method according claim 1, wherein the encryption is performed using a public key and wherein a private key, which corresponds to said public key, is created by performing a logarithmic function on said public key.

7. A system for securely computing a measure of similarity for at least two sets of data, the system comprising:
   a verifying device arranged to obtain a first set of encrypted data; and an authenticating sensor arranged to extract a first set of plaintext data from an individual and to encrypt the first set of plaintext data, wherein a second set of encrypted data is created; wherein said verifying device and said authenticating sensor are arranged to jointly compute, based on in part the first set of encrypted data and in part the second set of encrypted data, a measure of similarity for said first and second set of encrypted data;
   said authenticating sensor further being arranged to provide a publicly verifiable proof that the encrypted sets of data and the measure of similarity have been correctly computed, and to determine whether the measure of similarity complies with a predetermined criteria;
   wherein the data employed is extracted from a biometric feature of an individual, and the encryption performed comprises homomorphic encryption.

8. The system according to claim 7, further comprising an enrollment sensor arranged to extract a second set of biometric data from the individual and to encrypt second set of biometric data to create said first set of encrypted biometric data.

9. The system according to claim 7, wherein the verifying device is arranged to obtain the first set of encrypted data via a network.

10. The system in accordance with claim 7, wherein the measure of similarity is arranged such that it is considered to comply with a predetermined criteria if it lies below a preset threshold value.

11. The system in accordance with claim 7, wherein the encryption is performed using a public key and the system further being arranged such that a private key, which corresponds to said public key, is created by performing a logarithmic function on said public key.

12. The system in accordance with claim 7, wherein the joint computation of said measure of similarity is performed in that the authenticating sensor provides the second set of encrypted data and a combination of the first and second set of encrypted data, and the verifying device provides the first set of encrypted data.

13. The system in accordance with claim 7, further comprising a server to which encryptions and processing of data is outsourced.

14. A non-transitory computer readable medium for storing a computer program comprising computer-executable components for causing a device to perform the steps recited in claim 1 when the computer-executable components are run on a processing unit included in the device.

* * * * *